United States Patent
Srivastava et al.

(10) Patent No.: US 7,631,083 B2
(45) Date of Patent: *Dec. 8, 2009

(54) CONNECTION POOL AND PREPARED STATEMENT CACHE

(75) Inventors: Rahul Srivastava, Randolph, NJ (US); Adam Messinger, San Francisco, CA (US)

(73) Assignee: Bea Systems, Inc., Redwood Shores, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 11/692,096

(22) Filed: Mar. 27, 2007

(65) Prior Publication Data

US 2007/0288924 A1 Dec. 13, 2007

Related U.S. Application Data

(60) Continuation of application No. 11/413,950, filed on Apr. 28, 2006, now Pat. No. 7,222,179, which is a division of application No. 10/719,088, filed on Nov. 21, 2003, now Pat. No. 7,080,126.

(60) Provisional application No. 60/450,976, filed on Feb. 28, 2003.

(51) Int. Cl.
*G06F 15/16* (2006.01)
*G06F 15/173* (2006.01)

(52) U.S. Cl. .................. 709/226; 709/203; 709/223; 709/224; 709/229

(58) Field of Classification Search .................. 709/203, 709/208, 226, 318; 718/102, 107; 370/412
See application file for complete search history.

(56) References Cited

U.S. PATENT DOCUMENTS

| 5,991,792 | A | 11/1999 | Nageswaran | |
|---|---|---|---|---|
| 6,138,143 | A * | 10/2000 | Gigliotti et al. | 709/203 |
| 6,182,109 | B1 | 1/2001 | Sharma et al. | |
| 6,477,569 | B1 | 11/2002 | Sayan et al. | |
| 6,766,349 | B1 * | 7/2004 | Belkin | 718/102 |
| 6,901,446 | B2 | 5/2005 | Chellis et al. | |
| 7,065,764 | B1 * | 6/2006 | Prael et al. | 709/208 |
| 7,178,145 | B2 | 2/2007 | Bono | |
| 2002/0120744 | A1 * | 8/2002 | Chellis et al. | 709/226 |
| 2003/0076849 | A1 * | 4/2003 | Morgan et al. | 370/412 |
| 2003/0229888 | A1 | 12/2003 | Spotswood et al. | |
| 2003/0233485 | A1 * | 12/2003 | Khan | 709/318 |

(Continued)

OTHER PUBLICATIONS

Goetz, Brian, et al., "Java Theory and Practice: Thread Pools and Work Queues," Jul. 1, 2002, pp. 1-7, downloaded from http://www-128.ibm.com/developerworks/library/j-jtp0730.html.

*Primary Examiner*—Quang N. Nguyen
(74) *Attorney, Agent, or Firm*—Fliesler Meyer LLP

(57) ABSTRACT

An improved resource pool is provided that provides for dynamic configuration and is comprised of code that is configured to be used for different subsystems, including JDBC, Connector, and JMS subsystems. Pool maintenance, resource object creation and timeout, multiple deque management, and pool state transition features are provided. An application server may include at least one resource pool object, wherein each resource pool object represents a resource pool in the application server. An improved prepared statement cache is also provided that works in conjunction with the resource pool implementation to more effectively provide for prepared statement processing.

15 Claims, 7 Drawing Sheets

U.S. PATENT DOCUMENTS

2004/0045008 A1  3/2004  June et al.
2004/0088413 A1* 5/2004  Bhogi et al. ............... 709/226
2004/0154020 A1* 8/2004  Chen et al. ................. 718/107
2004/0215777 A1  10/2004 Piet et al.

* cited by examiner

CONNECTION POOL AND PREPARED STATEMENT CACHE

CLAIM TO PRIORITY

This application is a continuation of U.S. patent application Ser. No. 11/413,950, filed on Apr. 28, 2006, which is a divisional of U.S. patent application Ser. No. 10/719,088, filed on Nov. 21, 2003, now U.S. Pat. No. 7,080,126, issued Jul. 18, 2006, which claims priority under 35 U.S.C. §119(e) to U.S. Provisional Patent Application No. 60/450,976, filed on Feb. 28, 2003.

CROSS REFERENCE TO RELATED APPLICATIONS

The present application is related to the following United States Patent Applications, which applications are assigned to the owner of the present invention, and which applications are incorporated by reference herein in their entireties:

U.S. patent application Ser. No. 11/413,743, entitled "SYSTEM AND METHOD FOR PERFORMING RESOURCE MAINTENANCE IN A CONNECTION POOL," filed on Apr. 28, 2006, currently pending.

U.S. patent application Ser. No. 11/413,742, entitled "SYSTEM AND METHOD FOR PERFORMING RESOURCE POOL MAINTENANCE," filed on Apr. 28, 2006, currently pending.

U.S. patent application Ser. No. 10/719,611 entitled "METHOD FOR PERFORMING RESOURCE POOL MAINTENANCE BY MAINTAINING RESOURCES IN SEVERAL DEQUES," by Rahul Srivastava et al., filed on Nov. 21, 2003, now U.S. Pat. No. 7,080,145, issued Jul. 18, 2006.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to application server management, and more particularly to application server connection pool and statement cache management and implementation.

BACKGROUND OF THE INVENTION

Application servers provide an environment for programmers to write application programs that perform services. Application servers typically include resources provided by third party vendors that can be called by application programs. Application servers may implement large numbers of the resource objects for application program use. One such application server is Web Logic Server (WLS) of BEA Systems of San Jose, Calif.

Application servers implement a resource pool to manage and track resource status. Typically, different subsystems like JDBC, Connector and JMS subsystems use separate resource pooling code implementations. Each implementation generally performs the same function for the corresponding system.

Additionally, pool resource management and invocation can have negative effects on the efficiency of application program operation if the resources used by the application program are not properly managed in resource pools. One disadvantage of current application servers is that most of the management parameters are statically generated. What is needed is an application server that implements a resource pool that re-uses code common to different subsystems, allows for dynamic configuration, and achieves other improvements over previous application servers. Additionally, a statement cache that operates with the resource pool needed would be highly desirable.

SUMMARY OF THE INVENTION

In one embodiment of the present invention, an improved resource pool is provided that provides for dynamic configuration and is comprised of code that is configured to be used for different subsystems, including JDBC, Connector, and JMS subsystems. Pool maintenance, resource object creation and timeout, multiple deque management, and pool state transition features are provided. An application server may include at least one resource pool object, wherein each resource pool object represents a resource pool in the application server. An improved prepared statement cache is also provided that works in conjunction with the resource pool implementation to more effectively provide for prepared statement processing.

DETAILED DESCRIPTION

In one embodiment of the present invention, an improved resource pool is provided that provides for dynamic configuration and is comprised of code that is configured to be used for different subsystems, including JDBC, Connector, and JMS subsystems. Pool maintenance, resource object creation and timeout, multiple deque management, and pool state transition features are provided. An application server may include at least one resource pool object, wherein each resource pool object represents a resource pool in the application server. An improved prepared statement cache is also provided that works in conjunction with the resource pool implementation to more effectively provide for prepared statement processing.

Previously, JDBC and Connector subsystems within typical application servers have their own connection pool implementations. In one embodiment of the present invention, the JDBC, Connector, and JMS subsystems share common resource pool functions. Other subsystems may use the common resource pool functions as well. These three and other subsystems reuse code that implements common resource pooling functionality.

Resource pools may be implemented with a resource pool object. In one embodiment, resource pools consist of three deques called "RESERVED", "AVAILABLE", and "UNAVAILABLE". The deques may be implemented using proprietary (NOT java.util.LinkedList) doubly-linked lists. The three deques will respectively contain instances of resources that are currently reserved by, available or unavailable to be reserved by callers such as application programs. RESERVED contains resource instances that have been requested or are in use. AVAILABLE contains resource instances currently available in the resource pool. UNAVAILABLE will contain resource instances that were previously not created successfully or able to be refreshed, typically because the backend system (e.g., Database) is currently unavailable.

Figure 1:
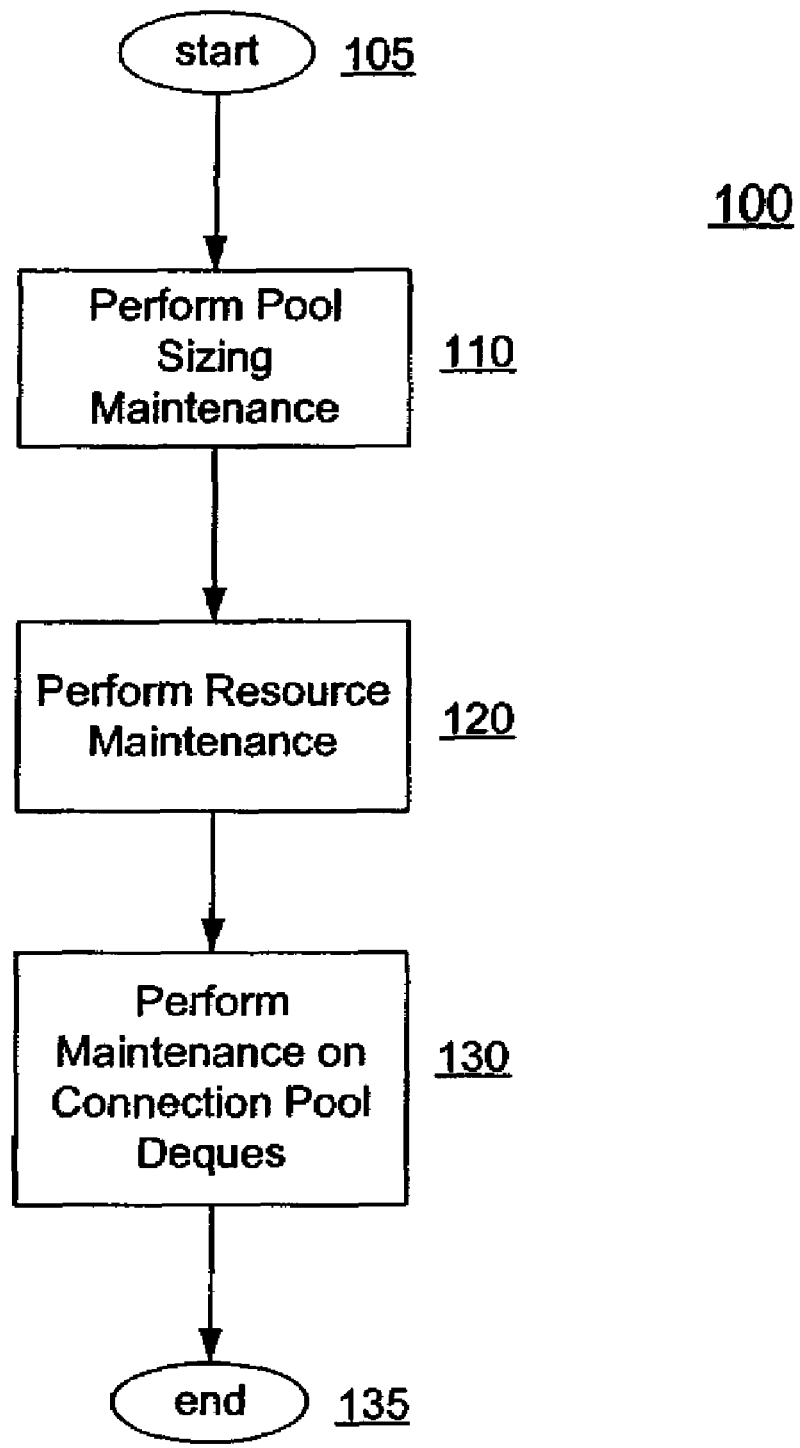
FIG. 1 is an illustration of a method for performing connection pool maintenance in accordance with one embodiment of the present invention.

FIG. 1 illustrates a method 100 for performing connection pool maintenance in accordance with one embodiment of the present invention. In one embodiment, method 100 is performed every time a resource pool object task is executed for a resource pool. Method 100 begins with start step 105. Next, any pool sizing maintenance is performed at step 110. Resource maintenance is then performed at step 120. Maintenance is then performed on Connection Pool deques at step 130. Operation of method 100 then terminates at step 135. For each of steps 110 through 130, the application server system may determine whether or not any action is actually performed. Thus, each of steps 110 through 130 is optional, and may be performed in a different order or not at all. In one embodiment, method 100 is carried out by a pool maintenance task that is created internally by the resource pool object and configured to run periodically. Steps 110, 120 and 130 are discussed in more detail in the methods illustrated in FIGS. 2, 3 and 4, respectively.

Figure 2:
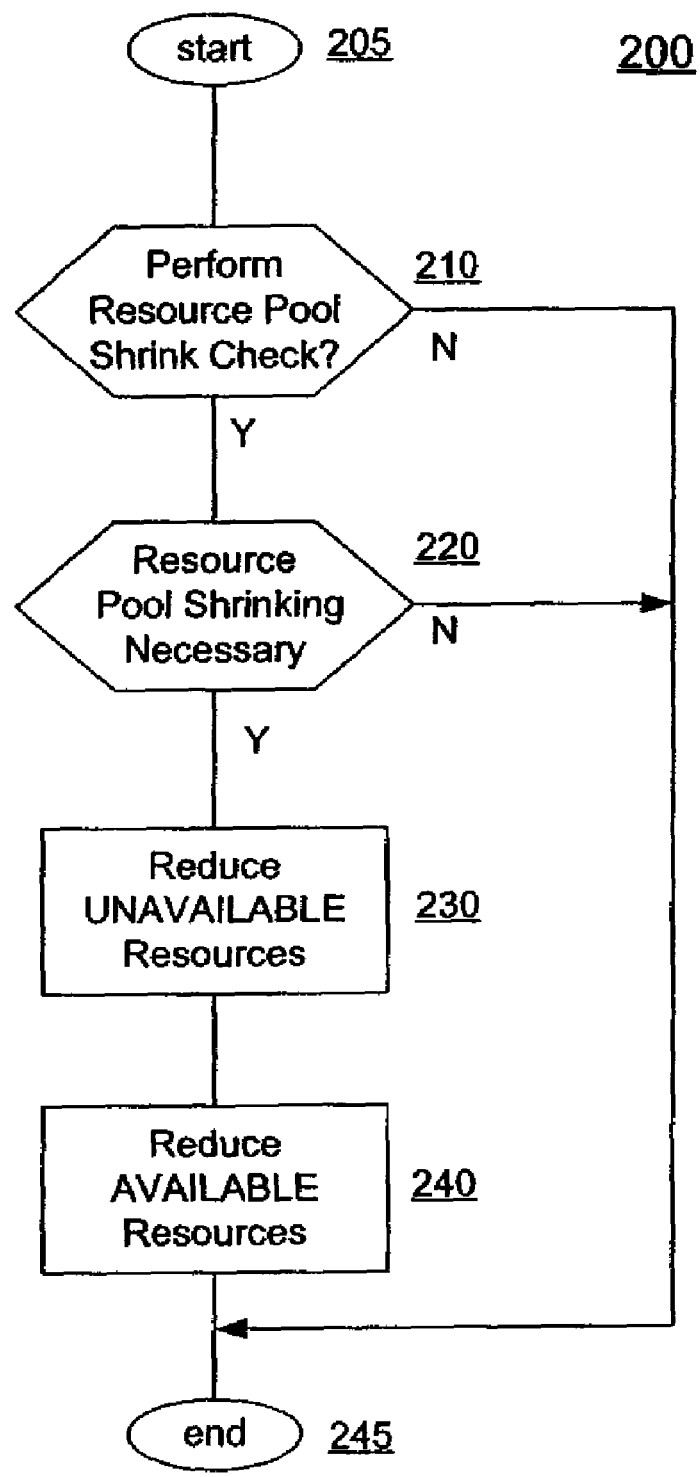
FIG. 2 is an illustration of a method for performing pool size maintenance in accordance with one embodiment of the present invention.

FIG. 2 illustrates a method 200 for performing pool size maintenance in accordance with one embodiment of the present invention. Method 200 begins with start step 205. Next, the resource pool object determines whether or not to perform a resource pool shrink check at step 210. Thus, the resource pool object determines whether or not it should inquire if pool shrinking may be necessary. In one embodiment, the resource pool object may implement pool shrinking periodically. In this case, an attribute may be set that determines the frequency of pool shrinking. The shrinking frequency attribute may be set by an application program or by the resource pool object. In one embodiment, the attribute is called "ShrinkFrequencySeconds". If the resource pool object is to check for required pool shrinking, operation continues to step 220. If a pool shrink check is not required, operation continues to step 245.

The resource pool object determines if pool shrinking is necessary at step 220. In one embodiment, pool shrinking is necessary if any resources are contained within the AVAILABLE AND UNAVAILABLE deque. In one embodiment, pool shrinking may be necessary if the number of resources currently in the pool exceeds the number of total resources allowed in a pool, or if the number of unavailable resources in a pool exceeds the number of unavailable resources allowed in a pool. Both the maximum resources allowed and maximum unavailable resources allowed may be set using a resource pool parameter. If pool shrinking is to be performed, operation continues to step 230. If no pool shrinking is to be performed, operation continues to step 245. At step 230, resources in the UNAVAILABLE deque are reduced. In one embodiment, the number of resources in the UNAVAILABLE deque is reduced to the coincide with the value of a highest number of UNAVAILABLE resources parameter. In one embodiment, the resource pool object destroys resources in the UNAVAILABLE deque. Next, resources in the AVAILABLE deque are reduced. In one embodiment, the number of resources in the AVAILABLE deque is reduced such that the total resources in the pool coincides with the value of a maximum number of resources parameter. In one embodiment, the resource pool object destroys resources in the AVAILABLE deque. Operation of method 200 then terminates at step 245.

Figure 3:
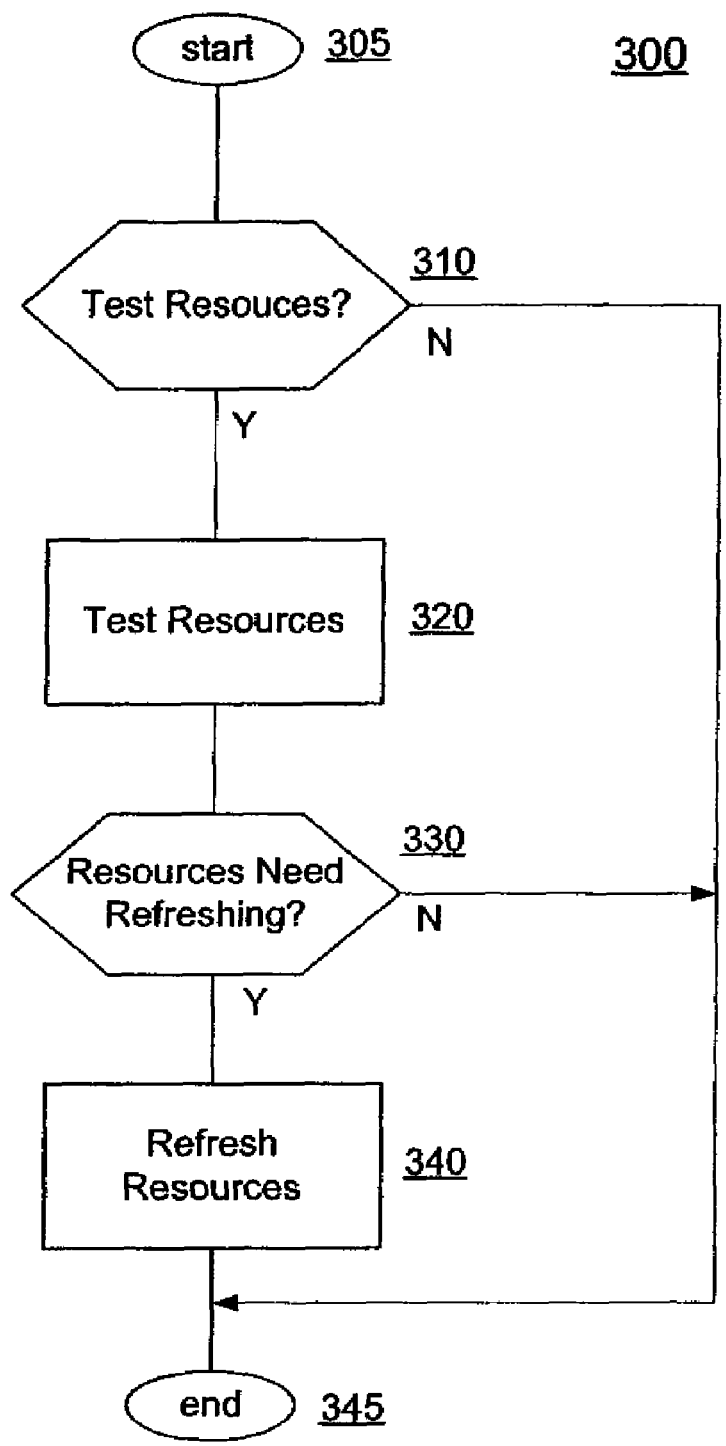
FIG. 3 is an illustration of a method for performing resource maintenance in accordance with one embodiment of the present invention.

FIG. 3 illustrates a method 300 for performing resource maintenance in accordance with one embodiment of the present invention. Method 300 begins with start step 305. Next, the resource pool object determines whether or not to test resources at step 310. In one embodiment, the resource pool object may test resources periodically. In this case, an attribute may be set that determines the frequency of resource testing. The resource testing attribute may be set by an application program or by the resource pool object. In one embodiment, the attribute is called "TestFrequencySeconds". If the resource pool object is to perform test resources, operation continues to step 320. If a resource test is not required, operation continues to step 345.

Resources are tested at step 320. In one embodiment, the resource test determines if the resource is functioning properly. If at step 330 any resources are determined to need refreshing, operation of method 300 continues to step 340. Resources may be determined to require refreshing based on the results of the resource test. If no resources need refreshing, operation continues to step 345. At step 340, resources are refreshed. Operation of method 300 then ends at step 345.

Figure 4:
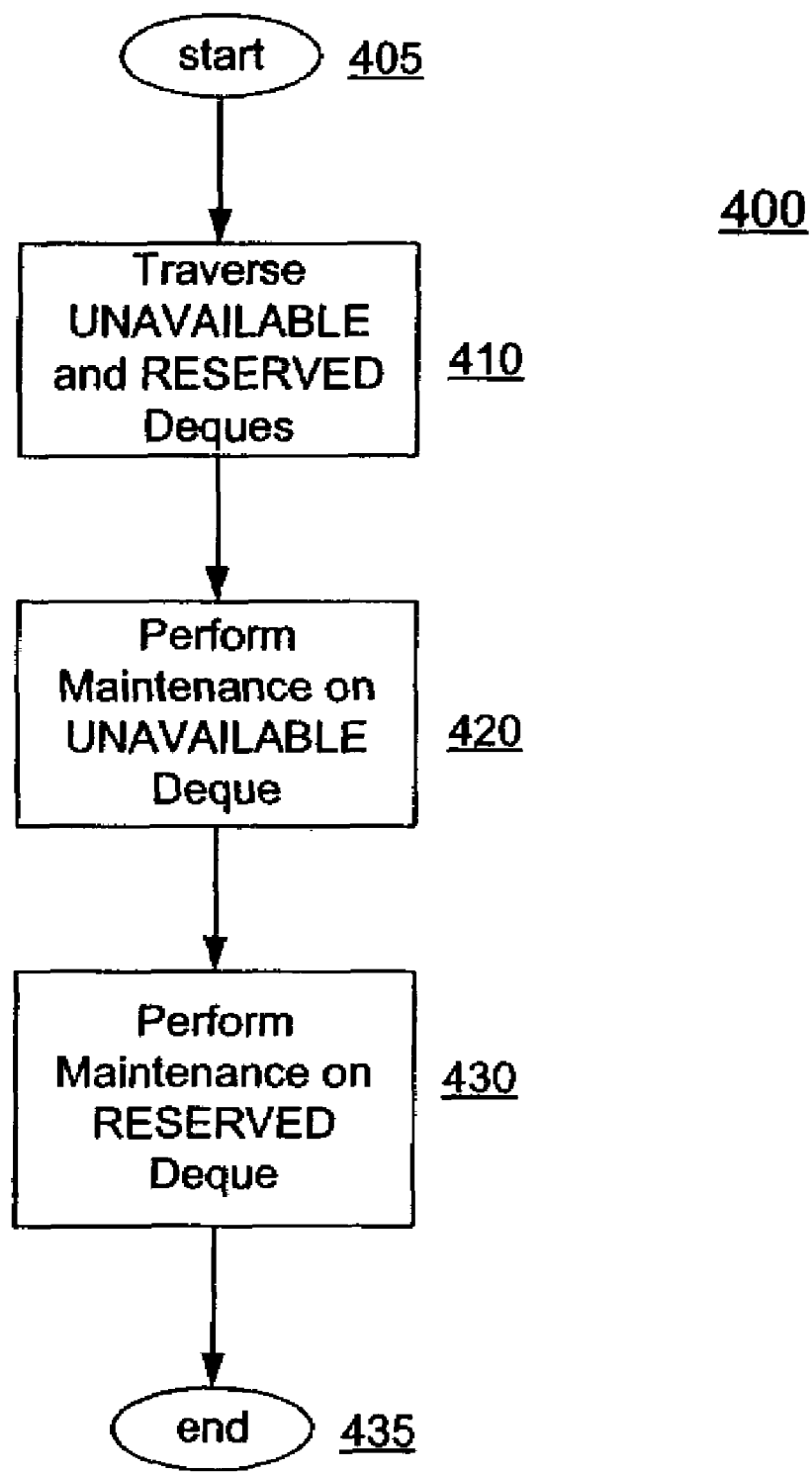
FIG. 4 is an illustration of a method for performing maintenance on connection pool deques in accordance with one embodiment of the present invention.

FIG. 4 illustrates a method 400 for performing maintenance on connection pool deques in accordance with one embodiment of the present invention. Method 400 begins with start step 405. The UNAVAILABLE and RESERVED deques are traversed by the resource pool object at step 410. In one embodiment, traversing the UNAVAILABLE and RESERVED deques includes determining what resources are in each deque, if any. Maintenance is then performed on the UNAVAILABLE deque at step 420. In one embodiment, the maintenance in step 420 includes scheduling resource creation for each resource in the UNAVAILABLE deque. Scheduled resource creation is discussed in more detail with reference to FIG. 5. Maintenance is then performed on the RESERVED deque at step 420. In one embodiment, the maintenance in step 420 includes scheduling maintenance for each resource in the RESERVED deque. Scheduled RESERVED maintenance is discussed in more detail with reference to FIG. 6. Operation of method 400 then ends at step 435.

Figure 5:
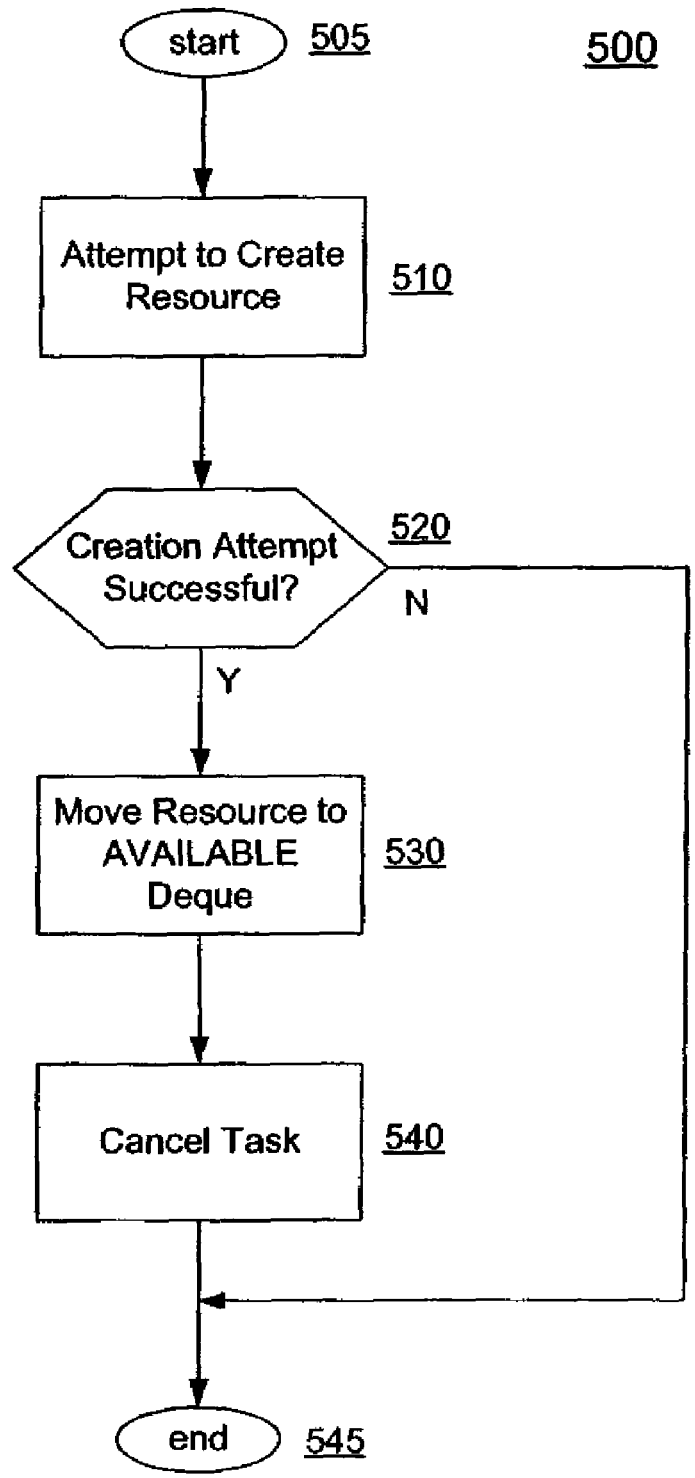
FIG. 5 is an illustration of a method for performing resource creation in accordance with one embodiment of the present invention.

FIG. 5 illustrates a method 500 for performing resource creation in accordance with one embodiment of the present invention. Method 500 may be performed by a resource creation retry task. In one embodiment, a resource is added to the UNAVAILABLE deque by the resource pool object if the resource cannot be created or refreshed. The next time method 100 executes and finds this resource on the UNAVAILABLE deque, the resource pool object will schedule the resource creation retry task on the resource.

Operation of method 500 begins with start step 505. Next, the resource pool object attempts to create the resource at step 510. If the resource pool object determines at step 520 that the creation attempt was successful, operation continues to step 530. If the creation attempt is determined to have failed, operation continues to step 545. At step 530, the created resource is moved to the AVAILABLE deque. The resource pool object is thus made available to an application. Next, the resource creation retry task on the resource is cancelled at step 540. Operation of method 500 then ends at step 545. In one embodiment, the periodicity of the resource creation retry attempts can be configured by either an application or the resource pool object. In an embodiment, an attribute "ResourceCreationRetrySeconds" may be set to determine the periodicity of the of the resource creation retry attempts.

Figure 6:
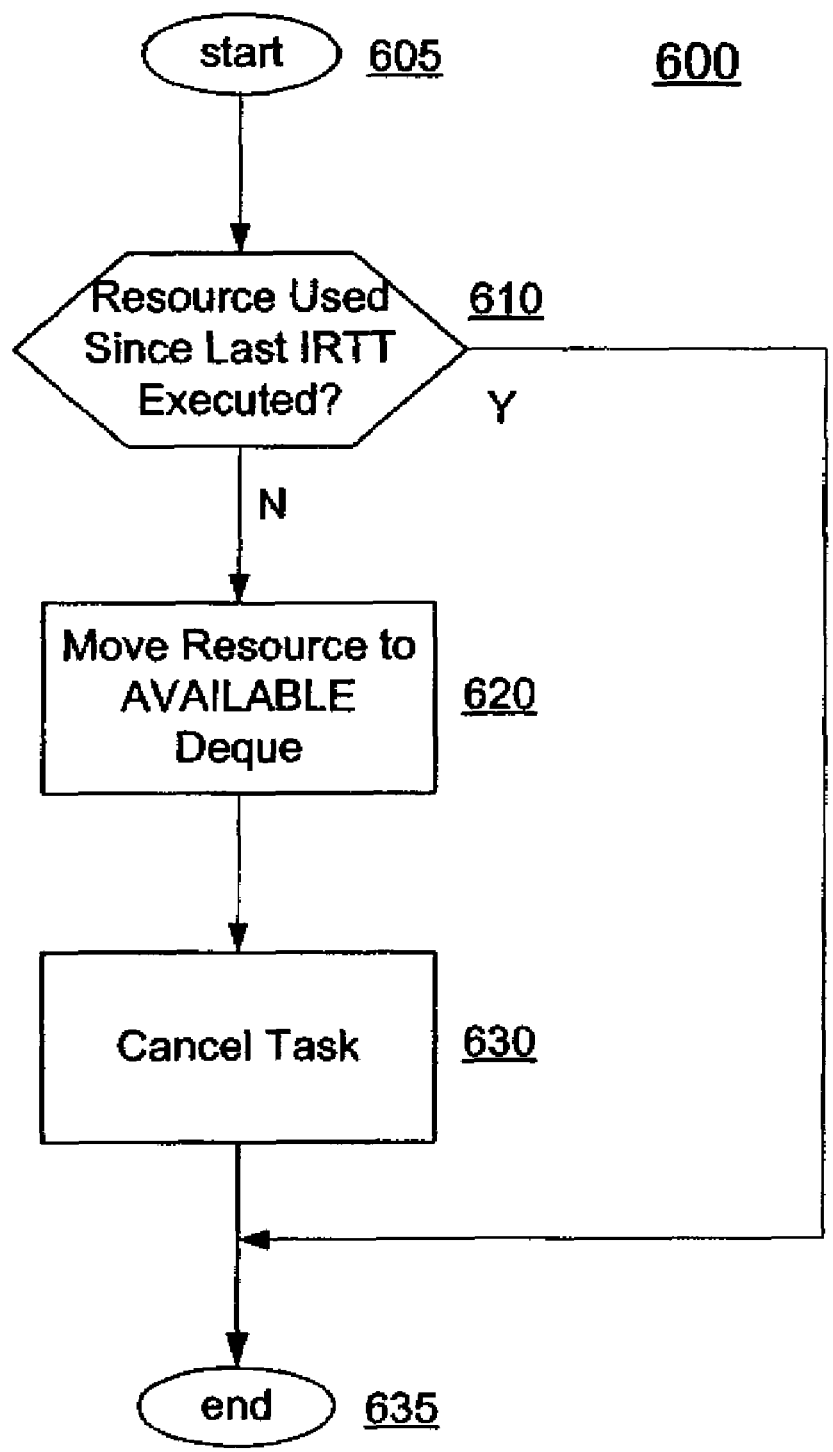
FIG. 6 is an illustration of a method for performing maintenance on reserved resources in accordance with one embodiment of the present invention.

FIG. 6 illustrates a method 600 for performing maintenance on reserved resources in accordance with one embodiment of the present invention. Method 600 may be performed by an inactive resource timeout task. In one embodiment, a resource is added to the RESERVED deque when it is called by an application program. The next time method 100 is performed, such as during execution of the pool maintenance task, and the resource is found on the RESERVED deque, the resource pool object may schedule an inactive resource timeout task on the resource.

Operation of method 600 begins with start step 605. At step 610, a check is made to determine whether a particular resource has been used since the last execution of method 600. In one embodiment, the check includes determining whether or not the resource has been used since the last execution of the inactive resource timeout task. If the resource was not used, operation continues to step 620. If the resource was used since the last timeout check, operation continues to step 635. At step 620, the resource is moved to the AVAILABLE deque. In this case, the resource is released back into the resource pool and made available to application programs. The inactive resource timeout task on the particular resource is then cancelled at step 630. Operation of method 600 then terminates at step 635. In one embodiment, the periodicity of the resource timeout check can be configured by either an application or the resource pool object. In an embodiment, an attribute "InactiveResourceTimeoutSeconds" may be set to determine the periodicity of the of the resource timeout checks.

Figure 7:
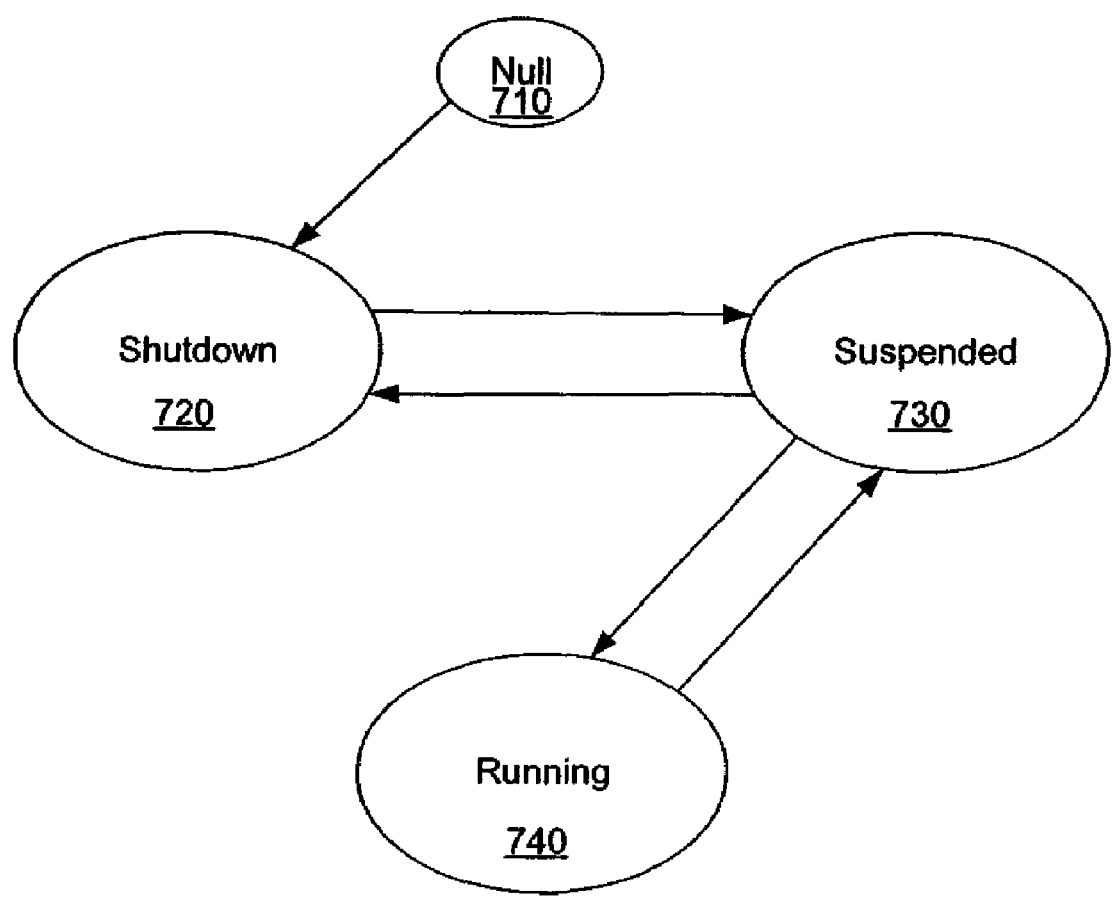
FIG. 7 is an illustration of system of state transitions for a resource pool in accordance with one embodiment of the present invention.

In embodiments discussed above, the methods of FIGS. 1, 5 and 6 may be carried out by tasks. In this embodiment, the pool maintenance task associated with method 100 may create the resource creation retry task associated with method 500 and the inactive resource timeout task associated with method 600. A resource creation retry task may be created on a resource only after the resource is moved into the UNAVAILABLE deques. An inactive resource timeout task may be created on a resource only after the resource is moved into the RESERVED deques. The resource creation retry task and the inactive resource timeout task are each cancelled when the corresponding resource is moved off the UNAVAILABLE or RESERVED deques. In one embodiment, no individual task is scheduled on resources sitting on the AVAILABLE deque. Resource pools may be in one of several operational states. In one embodiment, the resource pool states may include "SHUTDOWN", "SUSPENDED" and "RUNNING". FIG. 7 illustrates a system 700 of state transitions for a resource pool in accordance with one embodiment of the present invention. System 700 includes a null state 710, a shutdown state 720, a suspended state 730, and a running state 740. State transitions are allowed as indicated by the directional arrows in system 700. In particular, when a resource pool (RP) object is created, the RP state transitions from null to SHUTDOWN. When a RP is started, the RP state transitions from SHUTDOWN to SUSPENDED. When a suspended RP is resumed, the RP state transitions from SUSPENDED to RUNNING. When a RP is suspend, the RP state transitions from RUNNING to SUSPENDED. When an RP is forcefully Suspended, the RP state transitions from RUNNING to SUSPENDED. When an RP is shutdown, the RP state transitions from SUSPENDED to SHUTDOWN. If a valid state transition is attempted multiple times, all but the first attempt are deemed non-operation. In one embodiment, a resource in a pool can only be reserved when the resource pool is in the RUNNING state. When the pool is in the SHUTDOWN state, release, shrink and reset operations can not be performed.

In one embodiment, a resource pool may be implemented as a Java instance of a class. The class may extend the abstract class weblogic.common.resourcepool.ResourcePoolImpl in WLS (which implements the interface weblogic.common.resourcepool.ResourcePool). The interface weblogic.common.resourcepool.ResourcePool is shown below. The only method that will be declared abstract in this class will be "initPooledResourceFactory( )". Every other method in ResourcePool will be implemented in the base implementation ResourcePoolImpl (but can be overridden in the subclasses). In one embodiment of the JDBC subsystem, the WLS class weblogic.jdbc.common.internal.ConnectionPool extends the class ResourcePoolImpl.

```
import java.util.Properties;
// pool of PooledResource objects
public interface ResourcePool extends ObjectLifeCycle {
// pool management API
/**
 * initialize and return factory to create resource instances
 * @param poolInfo Properties object containing pool configuration
 attributes
(this object is initially passed to the generic resource pool object
constructor when the subsystem is instantiating the pool).
 */
private PooledResourceFactory initPooledResourceFactory (Properties
poolInfo)
throws ResourceException;
/**
 * shrink the pool
 * Shrinks the pool to the max of the currently reserved #
resources or the initial size
 */
public void shrink( ) throws ResourceException;
/**
 * refreshes all the resource instances in the pool.
 */
public void refresh( ) throws ResourceException;
/**
 * @return PoolState object containing the current state of the
pool. Can be one of the following:
 *     SHUTDOWN: initial (default) state
 *     SUSPENDED: pool is disabled
 *     RUNNING: pool is enabled
 */
public PoolState getState( );
// return all the resources in the pool
    public PooledResourceWrapper[ ] getResources( );
// pool access API
/**
 * reserve a resource in the pool
 * @param waitSeconds
 *     0 : wait for ever (blocking)
 *     >0 : wait for specified # seconds (blocking with timeout)
 *     −1 : don't wait (non-blocking)
```

-continued

```
 * @param info if not null, selected resource must match this
   criterion
 */
 public PooledResource reserveResource(int waitSeconds,
PooledResourceInfo info)
     throws ResourceException;
/**
 * reserve a resource in the pool. wait as long as specified in
 * "ReservedTimeoutSeconds" MBean attribute.
 * @param info if not null, selected resource must match this
   criterion
 */
 public PooledResource reserveResource(PooledResourceInfo info)
     throws ResourceException;
/**
 * release the resource back to the pool
 * @param resource to be released
 */
 public void releaseResource(PooledResource resource)
     throws ResourceException;
/**
 * create specified # instances of resources, upto the allowed
 * maximum capacity of the pool. associate a PooledResourceInfo
   object
 * from the array 'infoList' with each of the new resource
   instance.
 */
 public void createResources(int count, PooledResourceInfo[ ]
infoList)
     throws ResourceException;
/**
 * select a resource from the pool that matches the specified
 * PooledResourceInfo. returns 'null' if none found.
 * @param info if not null, selected resource must match this
   criterion
 */
 public PooledResourceWrapper matchResource(PooledResourceInfo
info)
     throws ResourceException;
// pool statistics API
// returns leaked resources (reserved from the pool but not
returned)
public int getNumLeaked( );
// increment # leaked resources (reserved from the pool but
not returned)
public int incrementNumLeaked( );
// returns count of # failed attempts to refresh resources
public int getNumFailuresToRefresh ( );
// returns averaged time (in milliseconds) to create a resource
instance.
public int getCreationDelayTime( );
// returns # waiters for resources
public int getNumWaiters( );
// returns high water mark of # waiters for resources
public int getHighestNumWaiters( );
// returns the longest # seconds a waiter waited for a resource
public int getHighestWaitSeconds( );
// returns total # resources allocated in the pool since its
creation
public int getTotalNumAllocated( );
public int getTotalNumDestroyed( );
public int getNumReserved( );
public int getNumAvailable( );
public int getNumUnavailable( );
public int getHighestNumReserved( );
public int getHighestNumUnavailable( );
public int getHighestNumAvailable( );
public int getAverageReserved( );
public int getResourceLeakProfileCount( );
public ResourceLeakProfile getResourceLeakProfiles(index,count);
// dynamically tunable attributes
public void setMaximumCapacity(int);
public void setInitialCapacity(int);
public void setCapacityIncrement(int);
public void setShrinkEnabled(boolean);
public void setShrinkFrequencySeconds(int);
public void setInactiveResourceTimeoutSeconds(int);
public void setResourceCreationRetrySeconds(int);
public void setHighestNumWaiters(int);
```

-continued

```
public void setHighestNumUnavailable(int);
public void setResourceReserveTimeoutSeconds(int);
}
```

In one embodiment, resource pool objects may invoke the different methods of pooled resource objects during the lifetime of the pool. Some of these methods in accordance with this embodiment of the present invention are shown below.

```
/* methods defined in weblogic.common.resourcepool.ObjectLifeCycle */
// create 'initialCapacity' instances of PooledResource
start( )
    call makeResources(initialCapacity)
// enable pool and all resources within it
resume( )
    call PR.enable( ) on all PRs in the pool
// disable pool and all resources within it.
suspend( )
    call PR.disable( ) on all PRs in the pool
// disable pool and all resources within it. destroys and recreates resource
instances currently reserved by users.
forceSuspend( )
    call PR.disable( ) on all PRs in the pool
    replaceResources(resvCount)
// destroy all pooled resource instances in the pool
shutdown( )
    calls PR.destroy( ) on all PRs in the pool
/* methods defined in weblogic.common.resourcepool.ResourcePool */
// reserve a resource from the pool
reserveResource( )
    if "testOnReserve" is enabled
        calls PR.test( ) to test resource
        if test fails, call PRF.refreshResource( )
// release a resource back into the pool
releaseResource( )
    call PR.cleanup( )
        if "testOnRelease" is enabled
            calls PR.test( ) to test resource
            if test fails, call PRF.refreshResource( )
// refresh all resources in the pool
refresh( )
    call PRF.refreshResource( ) for all PRs in the pool
// shrink the pool to greater of current usage and initial capacity
shrink( )
    call PR.destroy( ) on all the PRs selected to destroy
// private utility methods
makeResources(count)
    do the following 'count' number of times
        call PRF.createResource( ) to create resource
        call PR.initialize( ) to initialize the created resource
        call PR.getCreationTime( ) to collect statistics
        if 'testOnCreate' is enabled
            call PR.test( )
            if test fails, call PRF.refreshResource( )
replaceResources(count)
    do the following 'count' number of times
        call PR.destroy( )
    makeResources(count)
```

As discussed above, a resource pool object may be configured with parameters that define and control the resource pool. These attributes may be added to the respective external representations across the subsystems. Examples of these parameters are discussed briefly. The CapacityIncrement parameter specifies the increment by which the pool size is increased. In one embodiment, the maximum value is java.lang.Integer.MAX_VALUE, minimum is 1 and default is 1.

The HighestNumWaiters parameter specifies the maximum number of waiters that can concurrently block waiting to reserve a resource from the pool. For example, the number of waiters may be the number of threads trying to access connection objects. In this case, the parameter specifies that there is a maximum number of threads that can wait for connection objects. The remainder of the threads will not by allowed to wait. Typically, they will perform re-try attempts. In one embodiment, the maximum value is java.lang.Integer.MAX_VALUE, minimum is 0 and default is 0 (feature disabled).

The HighestNumUnavailable parameter specifies the maximum number of resource instances in the pool that can be made unavailable (to the application) for purposes like refreshing the resource. Note that in cases likes the backend system being unavailable, this specified value could be exceeded due to factors outside the pool's control. In one embodiment, the maximum value is java.lang.Integer.MAX_VALUE, minimum is 0 and default is 0 (feature disabled). The InitialCapacity specifies the number of resource instances contained in the pool when it is first created. In one embodiment, the maximum value is java.lang.Integer.MAX_VALUE, minimum is 0 and default is 1. The InactiveResourceTimeoutSeconds parameter specifies the number of seconds of inactivity after which a reserved resource will automatically be reclaimed back by the pool. In one embodiment, the maximum value is java.lang.Integer.MAX_VALUE, minimum is 0 and default is 0 (feature disabled). The ShrinkEnabled parameter is a Boolean flag to enable the shrink feature. In one embodiment, the default is true. The MaximumCapacity parameter specifies the maximum number of resource instances contained in the pool. In one embodiment, the maximum value is java.lang.Integer.MAX_VALUE, minimum is 1 and default is 1. The Name parameter specifies the name of the pool.

The ResourceCreationRetryFrequencySeconds parameter specifies the periodicity of retry attempts by the pool to establish resource instances. Unlike previous connection pools, if a requested resource, such as a database, is down, the resource pool will still be created. The created pool will attempt to retry connections with the down resource periodically as configured. In one embodiment, the maximum value is java.lang.Integer.MAX_VALUE, minimum is 0 and default is 0 (feature disabled). The ResourceReserveTimeoutSeconds parameter specifies the number of seconds after which the call to reserve a resource from the pool will timeout. Thus, this parameter allows a limit to be placed on the time waiting for a requested resource. In one embodiment, the maximum value is java.lang.Integer.MAX_VALUE, minimum is −1 and default is −1 (don't block when reserving resources).

The ShrinkFrequencySeconds parameter specifies the periodicity at which the pool is shrunk. In one embodiment, the maximum value is java.lang.Integer.MAX_VALUE, minimum is 0 and default is 0 (attribute disabled to interoperate with deprecated attributes like 'ShrinkPeriodMinutes' for JDBC, etc.). The TestFrequencySeconds parameter specifies the periodicity at which resource instances in the pool are tested. In one embodiment, the maximum value is java.lang.Integer.MAX_VALUE, minimum is 0 and default is 0 (attribute disabled to interoperate with deprecated attributes like 'RefreshMinutes' for JDBC, etc.). The TestOnCreate parameter is a Boolean flag to enable testing of newly created resource instances. In one embodiment, the default is false. The TestOnRelease parameter is a Boolean flag to enable testing of resource instances when they are being released back into the pool. In one embodiment, the default is false. The TestOnReserve parameter is a Boolean flag to enable testing of resource instances when they are being reserved. In one embodiment, the default is false.

A SecurityContext parameter may specify the minimum acceptable security context for a connection. This parameter specifies the security context that an application program is looking for in a resource. In one embodiment, the security context feature is an extension of the resource matching feature in WLS, which associates a context which each source. In the resource matching feature, and example of a resource context that a resource may require is javax.resource.spi.connetionrequestinfo.

Some of the parameters discussed above may be dynamically configurable. In one embodiment, the dynamically configurable resources include MaximumCapacity, InitialCapacity, CapacityIncrement, ShrinkEnabled, TestOnReserve, TestOnRelease, TestOnCreate, ShrinkFrequencySeconds, InactiveResourceTimeoutSeconds, ResourceCreationRetrySeconds, HighestNumWaiters, HighestNumUnavailable, and ResourceReserveTimeoutSeconds.

Resource pools maintain a pool of pooled resource objects for use by application programs. In one embodiment, they implement the WLS interface weblogic.common.resourcepool. PooledResource. The WLS interface weblogic.common.resourcepool.PooledResource is illustrated below. In one embodiment in the JDBC subsystem, the class weblogic.jdbc.common.internal.ConnectionPoolEnv implements the interface PooledResource. The resource pooled object invokes the "createResource( )" methods of PRF objects to create new resource instances and "refreshResource(PooledResource)" to refresh the specified resource.

```
//  objects that need to be pooled in ResourcePools must implement this
interface.
public interface PooledResource {
// Lifecycle API
/**
 * one time initialization of the object. typically used if creation
 * and initialization of the object are separate operations (hence
 * constructor can't do initialization also).
 */
public void initialize( );
// enable object for use by consumers.
public void enable( );
// disable object so that it can't be used by consumers.
public void disable( );
// when a resource is being released back into the pool, this is called
to clean the resource
//before it is added back into the pool.
public void cleanup( ) throws ResourceException;
// destructor (typically, the inverse of the constructor and/or
'initialize').
public void destroy( );
// Management API
/**
 * test the resource
 * @returns
 *      0: test wasn't run (presume success)
 *      1: test was successful
 *     -1: test failed
 */
public int test( ) throws ResourceException;
// returns time taken (in milliseconds) to create the resource
public int getCreationTime( ) throws ResourceException;
// mark the resource as having being used.
public void setUsedFlag(boolean newValue);
// return whether the resource has been used or not.
public boolean getUsedFlag( );
}
```

A subsystem that wants to pool resources in a resource pooled object may provide a factory that creates the pooled resource object to be pooled. In one embodiment, the factory object will implement the WLS interface weblogic.common.resourcepool. PooledResourceFactory. The interface weblogic.common. resourcepool.PooledResourceFactory is shown below. In one embodiment of the JDBC subsystem, the class weblogic. jdbc.common.internal. ConnectionPoolEnvFactory implements the interface PooledResourceFactory.

```
// Used to create instances of PooledResource objects.
public interface PooledResourceFactory {
/**
 * Creates a new instance of a resource when invoked by a resource pool.
 * @return New instance of the resource created
 */
public PooledResource createResource( ) throws ResourceException;
/**
 * Refreshes specified instance of resource.
 * for resources that are wrappers around connections to backend
systems, this method will typically close and re-establish the physical
connection to the backend, while preserving the remaining state of the
wrapper object.
 * for other resources, this method will typically call PR.destroy( ) on the
existing resource and then call createResource( ).
 */
public void refreshResource(PooledResource) throws ResourceException;
}
```

In one embodiment of the present invention, an improved prepared statement cache is provided. The prepared statement cache provides for generated prepared statements to be cached such that they can by used by other requesting entities without having to generate the prepared statement another time. The new implementation will enable applications to control and dynamically configure the number of prepared statements that are cached, select an algorithm from a predefined list that controls the behavior of the cache, dynamically enable, disable and clear the cache, and make use of the caching of prepared statements being done at the driver level (when using JDBC 3.0 compliant drivers). The new functionality and control may be exposed via new methods on the JDBCConnectionPoolMBean and JDBCConnectionPoolRuntimeMBean.

Several algorithms may be used to implement the prepared statement cache. In one algorithm, the prepared statements not used within a certain period may be removed from the cache. In another algorithm, once a certain number (that is less than the number of total prepared statements allowed) of prepared statements has been cached, for each added statement or number of statements added, the same number of statements is removed. The removed statements may be either the least used statements in a certain time period or for the duration of the cache. These algorithms are for illustration purposes, and other prepared statement caching algorithms are considered within the scope of the present invention. Alternatively, a non-algorithm caching method may be implemented wherein a set number of specific prepared statements are contained in the cache. The statement cache can also be cleared by an application program. Alternatively, selected prepared statements may be cleared from the cache.

In one embodiment, the prepared statement cache may have a number of attributes to configure its operation. A StatementCacheSize attribute specifies the maximum size of the cache. Maximum allowed value for this attribute is 300, minimum is 0 and default is 0 (feature disabled). This attribute is dynamically configurable. A StatementCacheAlgorithm attribute specifies the algorithm to use to determine which statement in the cache should be closed and removed from the cache to make space for the new statement to be cached. A StatementCacheEnabled attribute indicates whether the application program requests to use the cache or not. Allowed values are "true" and "false" and default is "false" (feature disabled). This attribute is dynamically configurable.

Methods will be added to the JDBCConnectionPoolMBean to access or modify the above attributes:

```
get StatementCacheSize( );
void setStatementCacheSize(int newVal);
String getStatementCacheAlgorithm( );
boolean getStatementCacheEnabled( ); and
void setStatementCacheEnabled(boolean newVal).
```

A method added to the JDBCConnectionPoolRuntimeMBean to enable applications to clear the cache is: void clearStatementCache( ).

In one embodiment of the present invention, an improved resource pool is provided that provides for dynamic configuration and is comprised of code that is configured to be used for different subsystems, including JDBC, Connector, and JMS subsystems. Pool maintenance, resource object creation and timeout, multiple deque management, and pool state transition features are provided. An application server may include at least one resource pool object, wherein each resource pool object represents a resource pool in the application server. An improved prepared statement cache is also provided that works in conjunction with the resource pool implementation to more effectively provide for prepared statement processing.

Other features, aspects and objects of the invention can be obtained from a review of the figures and the claims. It is to be understood that other embodiments of the invention can be developed and fall within the spirit and scope of the invention and claims.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to, configuring and implementing resource pool objects, pooled resource objects, and prepared statement caches.

What is claimed is:

1. A system for prepared statement processing for requesting entities in an application server, comprising:
   a prepared statement that is generated for a requesting entity by an application executing on the application server;
   a cache module that provides the generated prepared statement to be cached such that it can be used by other requesting entities without having to generate the prepared statement another time;
   wherein said cache module enables the application to dynamically control and configure the cache module; and
   a predefined list of algorithms that control the behavior of said cache module wherein said application is configured to select an algorithm from said pre-defined list in order to perform at least one of: enable said cache module, disable said cache module, clear said cache module and make use of caching of prepared statements at a driver level;
   wherein said list of pre-defined algorithms includes an algorithm that removes a number of prepared statements from said cache module for each said number of prepared statements added to the cache module, once a specific number of prepared statements have been cached and wherein the prepared statements removed from said statement cache are least used statements in at least one of: a specific time period or for the duration of said statement cache.

2. The system of claim 1 further comprising:
   a statement cache size attribute that specifies the maximum size of the cache module, said statement cache size attribute being dynamically configurable by said application.

3. The system of claim 1, wherein said list of pre-defined algorithms includes an algorithm that removes prepared statements from said cache module if the prepared statements have not been used within a specified period of time.

4. The system of claim 1 wherein said cache module implements a non-algorithm caching method such that the cache module contains a set number of specific prepared statements.

5. The system of claim 1 further comprising:
   a statement cache algorithm attribute that specifies the algorithm to use in order to determine which prepared statement in said cache module should be closed and removed from said cache module to make space for a new prepared statement to be cached wherein said statement cache algorithm attribute is dynamically configurable by said application.

6. The system of claim 1 wherein said cache module works in conjunction with a connection pool implementation of said application server to provide prepared statement processing.

7. The system of claim 1 wherein said prepared statement processing is exposed via methods on a JDBC connection pool MBean and a JDBC connection pool runtime MBean of said application server.

8. A method for prepared statement processing for requesting entities in an application server, said method comprising:
   maintaining an application server having an application deployed thereon;
   generating one or more prepared statements for a requesting entity;
   storing the one or more prepared statements into a statement cache residing on said application server such that the one or more prepared statements can be used by other requesting entities without having to re-generate the one or more prepared statements at a second time; and
   dynamically configuring the statement cache by said application wherein said configuring includes selecting an algorithm from a list of pre-defined algorithms that controls behavior of said statement cache in order to perform at least one of: enable said statement cache, disable said statement cache, clear said statement cache and make use of caching of prepared statements at a driver level;
   wherein said list of pre-defined algorithms includes an algorithm that removes a number of prepared statements from said statement cache for each said number of prepared statements added to the statement cache, once a specific number of prepared statements have been cached and wherein the prepared statements removed from said statement cache are least used statements in at least one of: a specific time period or for the duration of said statement cache.

9. The method of claim 8 wherein said algorithm removes prepared statements from said statement cache if the prepared statements have not been used within a specified period of time.

10. The method of claim 8 wherein said statement cache implements a non-algorithm caching method such that the statement cache contains a set number of specific prepared statements.

11. The method of claim 8 further comprising:
   providing a statement cache size attribute that specifies the maximum size of the statement cache, said statement cache size attribute being dynamically configurable by said application.

12. The method of claim 8 further comprising:
   providing a statement cache algorithm attribute that specifies the algorithm to use in order to determine which prepared statement in said statement cache should be closed and removed from said statement cache in order to make space for a new prepared statement to be cached wherein said statement cache algorithm attribute is dynamically configurable by said application.

13. The method of claim 8 wherein said statement cache works in conjunction with a resource pool implementation of said application server to provide prepared statement processing.

14. The method of claim 8 wherein said prepared statement processing is exposed via methods on a JDBC connection pool MBean and a JDBC connection pool runtime MBean of said application server.

15. A computer readable storage medium having instructions stored thereon which when executed by one or more processor, cause a system to:

maintain an application server having an application deployed thereon;

generate one or more prepared statements for a requesting entity;

store the one or more prepared statements into a statement cache residing on said application server such that the one or more prepared statements can be used by other requesting entities without having to re-generate the one or more prepared statements at a second time; and dynamically configure the statement cache by said application wherein said configuring includes selecting an algorithm from a list of pre-defined algorithms that controls behavior of said statement cache in order to perform at least one of: enable said statement cache, disable said statement cache, clear said statement cache and make use of caching of prepared statements at a driver level;

wherein said list of pre-defined algorithms includes an algorithm that removes a number of prepared statements from said statement cache for each said number of prepared statements added to the statement cache, once a specific number of prepared statements have been cached and wherein the prepared statements removed from said statement cache are least used statements in at least one of: a specific time period or for the duration of said statement cache.

* * * * *

UNITED STATES PATENT AND TRADEMARK OFFICE
CERTIFICATE OF CORRECTION

PATENT NO.         : 7,631,083 B2                                                        Page 1 of 1
APPLICATION NO.    : 11/692096
DATED              : December 8, 2009
INVENTOR(S)        : Rahul Srivastava et al.

It is certified that error appears in the above-identified patent and that said Letters Patent is hereby corrected as shown below:

In column 4, line 10, delete "to the" and insert -- to --, therefor.

In column 10, line 5-6, delete "javax.resource.spi.connetionrequestinfo." and insert -- javax.resource.spi.connectionrequestinfo. --, therefor.

In column 13, line 53, in claim 3, delete "l," and insert -- 1, --, therefor.

In column 14, line 67, in claim 15, delete "processor," and insert -- processors, --, therefor.

Signed and Sealed this

Nineteenth Day of October, 2010

David J. Kappos
*Director of the United States Patent and Trademark Office*